(12) United States Patent
Vitorica Murguia et al.

(10) Patent No.: US 9,550,697 B2
(45) Date of Patent: Jan. 24, 2017

(54) BRIQUETTE USED FOR THE PRODUCTION OF ROCK WOOL AND METHOD FOR THE PRODUCTION OF SAID BRIQUETTE

(71) Applicant: VALORIZACIÓN Y LOGÍSTICA AMBIENTAL, S.L.L., Bilbao (ES)

(72) Inventors: Ramon Vitorica Murguia, Munguia (ES); Oscar Gutierrez San Martin, Vitoria (ES)

(73) Assignee: VALORIZACION Y LOGISTICA AMBIENTAL, S.L.L., Bilbao (ES)

( * ) Notice: Subject to any disclaimer, the term of this patent is extended or adjusted under 35 U.S.C. 154(b) by 0 days.

(21) Appl. No.: 14/436,752

(22) PCT Filed: Nov. 8, 2013

(86) PCT No.: PCT/ES2013/070769
§ 371 (c)(1),
(2) Date: Apr. 17, 2015

(87) PCT Pub. No.: WO2014/072560
PCT Pub. Date: May 15, 2014

(65) Prior Publication Data
US 2016/0168009 A1 Jun. 16, 2016

(30) Foreign Application Priority Data

Nov. 12, 2012 (ES) .................................. 201231735
Oct. 31, 2013 (ES) .................................. 201331598

(51) Int. Cl.
C03C 13/00 (2006.01)
C03C 13/06 (2006.01)
C03B 1/02 (2006.01)
C03B 13/06 (2006.01)
C03C 1/00 (2006.01)

(52) U.S. Cl.
CPC ................. *C03C 1/002* (2013.01); *C03B 1/02* (2013.01); *C03C 13/06* (2013.01); *Y02P 40/52* (2015.11); *Y02P 40/58* (2015.11)

(58) Field of Classification Search
CPC .......... C03C 1/002; C03C 1/026; C03C 13/00; C03C 13/06; C03B 1/02; C03B 13/06
See application file for complete search history.

(56) References Cited

U.S. PATENT DOCUMENTS

| | | | | |
|---|---|---|---|---|
| 4,396,561 A * | 8/1983 | Liebert | ..................... | C03B 1/00 264/109 |
| 4,617,045 A * | 10/1986 | Bronshtein | ............... | C03B 1/02 501/155 |
| 4,720,295 A * | 1/1988 | Bronshtein | ............... | C03B 5/16 501/155 |
| 5,198,190 A * | 3/1993 | Philipp | ..................... | C03B 3/02 420/582 |
| 5,364,447 A * | 11/1994 | Philipp | ..................... | C03B 3/02 588/319 |
| 5,472,917 A * | 12/1995 | Talling | ..................... | C03B 1/02 106/714 |
| 6,074,967 A * | 6/2000 | Erskine | ..................... | C03B 1/02 501/27 |
| 2004/0011246 A1* | 1/2004 | Perander | ............. | B01J 13/0013 106/18.12 |
| 2006/0162391 A1* | 7/2006 | Hansen | ..................... | C03B 1/02 65/482 |
| 2012/0186491 A1* | 7/2012 | Cuypers | ..................... | C03B 3/02 106/439 |
| 2013/0165553 A1* | 6/2013 | Cuypers | ..................... | C03B 1/02 524/5 |

FOREIGN PATENT DOCUMENTS

| | | |
|---|---|---|
| CN | 102745949 A | 10/2012 |
| WO | WO 97/25286 A1 | 7/1997 |

OTHER PUBLICATIONS

IPRP/Written Opinion dated May 21, 2015 along with the English translation thereof for the PCT Application No. PCT/ES2013/070769.

* cited by examiner

*Primary Examiner* — Elizabeth A Bolden
(74) *Attorney, Agent, or Firm* — Lucas & Mercanti, LLP

(57) ABSTRACT

The present invention relates to a briquette used for the production of rock wool and method for the production of said briquette, wherein the briquette contains a raw material comprising rock wool waste having a fiber morphology; contains a non-fibrous inorganic binder, such as sodium silicate, to bind the raw material; and an activating agent accelerating the curing process of the briquetted raw material.

11 Claims, 2 Drawing Sheets

BRIQUETTE USED FOR THE PRODUCTION OF ROCK WOOL AND METHOD FOR THE PRODUCTION OF SAID BRIQUETTE

CROSS REFERENCE TO RELATED APPLICATIONS

This Application is a 371 of PCT/ES2013/070769 filed on Nov. 8, 2013 which, in turn, claimed the priority of Spanish Patent Application No. P201231735 filed on Nov. 12, 2012 and Spanish Patent Application No. P201331598 filed on Oct. 31, 2013, all applications are incorporated herein by reference.

FIELD OF THE ART

The present invention relates to briquettes, or solid blocks, used for material recovery from rock wool waste and its possible mixing with fines from residual materials from other industries or not, and/or alternative fuels of a residual origin, which supply heat in furnaces, boilers or the like, proposing a briquette which is used in the mineral fiber manufacturing industry, more specifically for the rock wool manufacturing industry.

STATE OF THE ART

Rock wool is a mineral fiber used primarily in the construction sector as thermal insulation, or as a fire protection element. Rock wool is obtained by melting basalt raw material at more than 1600° C., in a melting furnace, generally in a cupola furnace; the molten material is subjected to the effect of centrifugal force to generate fibers that will form the final rock wool product.

Currently rock wool wastes, surplus or rejects, as well as other residual materials from other industries, are compacted to form recycling briquettes, which are introduced in the cupola furnace to be transformed back into rock wool.

Binders are known to be used to produce briquettes with mechanical strength suitable for industrial handling. Low sulfur content cement is currently used as a binder for manufacturing briquettes. Nevertheless, the sulfur emission rate using these briquettes that are briquetted with cement, continues to be high because rock wool has organic compounds that act adversely with cement, such that it is necessary to increase the percentage of cement to produce a briquette with suitable mechanical strength. On the other hand, in addition to the environmental issue generated by sulfur dioxide emissions during combustion of the briquettes, an economic issue is also generated, as a higher percentage of cement is required to produce the desired mechanical strength.

Patent document WO97/25286 discloses a method for the production of briquettes which are used in manufacturing rock wool. In the production of rock wool, when the molten material is introduced in the cupola furnace and is subjected to the action of centrifugal force, rock wool fibers are generated, 70% of which has a fibrous form, and 30% has a form of spherical granules which are not valid for industrial use. Patent document WO97/25286 proposes recovering those spherical granules of rock wool to form briquettes which are used again in manufacturing new rock wool.

The spherical granules of rock wool are ground in a gyratory crusher until producing a finely divided material with a uniform particle size of less than 30 mm. To produce a briquette with suitable mechanical consistency, patent document WO97/25286 proposes binding the spherical granules finely divided using a fibrous binder, specifically cellulose fiber (recycled paper) which, like the spherical granules, is ground to produce particles having an approximate dimension of 2 mm. Additionally, to make the briquette harder so that it can be correctly handled in an industrial setting, patent document WO97/25286 requires adding a hardening product to the mixture of spherical granules of rock wool and cellulose fiber, such as sodium silicate, calcium silicate or aluminum silicate.

This solution allows producing a briquette that reduces sulfur dioxide emissions during combustion of the briquettes, however it requires using a fibrous binder to be able to produce a briquette with suitable mechanical consistency, in addition to requiring the use of special machinery for milling and grinding the granules of rock wool and cellulose fiber and to be able to produce particles having a uniform size.

An alternative solution which allows the production of briquettes with a low sulfur dioxide emission and which prevents the need to use a fibrous binder to provide the briquette with suitable mechanical strength for correct industrial handling is therefore necessary.

OBJECT OF THE INVENTION

The present invention proposes an alternative process to the process currently used by the mineral fiber manufacturing industry and, more specifically, by the rock wool manufacturing industry, which provides significant improvements on an environmental level and greater utilization of energy resources, giving rise to briquettes with less global impact throughout their life cycle.

The invention proposes a briquette which is used for the production of rock wool, wherein the briquette consists of a raw material, a binder of that raw material and an activating agent accelerating the curing (hardening) process of the briquetted raw material. The raw material used for manufacturing the briquette comprises rock wool waste, whereas a non-fibrous inorganic binder, such as sodium silicate, is used to bind the raw material instead of using cement like in conventional solutions, the sulfur emission problem which is generated with the cement binders of conventional solutions thereby being eliminated.

Specifically, the invention proposes using trimmings, surplus or rejects from the production of rock wool having a fiber morphology, such that when a raw material with a fibrous form is used, it is not necessary to use a fibrous binder like in conventional solutions to produce a briquette with the mechanical consistency necessary for correct industrial handling. Therefore, the invention proposes using a single type of non-fibrous binder, such as silicate, to bind the raw material of rock wool fibers.

The fibers used as raw material for the production of the briquettes have a diameter between 1 μm and 30 μm, with a fiber length to fiber diameter ratio of at least 3:1. The density of the fibers used as raw material is comprised between 0.18 and 0.99 g/cm$^3$.

The possibility of the raw material, in addition to rock wool waste, being able to comprise fines from residual materials and/or fuels of a residual origin has been envisaged. The fines from residual materials are fines from other industries or not, such as for example, coke fines, steel mill and foundry slag, foundry sand or other raw material rejects the grain size distribution of which is not suitable for direct furnace feed. Torrefied biomass, conventional biomass, sewage sludge, SRF or any other residue supplying calorific value and complying with environmental and technical parameters required by the competent administration and the production process is used as fuel of a residual origin.

Therefore, the raw material used for manufacturing the briquette has a composition by weight of 50% to 100% of rock wool waste, of between 0% and 50% of fines from residual materials, and of between 0% and 50% of fuels of a residual origin. The proportion by weight of the sodium silicate binder is from 3% to 20% in relation to the total weight of the raw material used.

Even more preferably, the proportion by weight of the sodium silicate binder is from 6% to 16% in relation to the total weight of the raw material used. By using this amount of binder together with the rock wool fibers, briquettes are produced with a density of between 1.2 and 2.8 g/cm$^3$, which density is sufficient for the briquette to be handled on an industrial level without causing it to break.

The possibility of using an ester as the activating agent used to accelerate the curing process of the briquette in a percentage of 0% to 4% by weight in relation to the total weight of the raw material used has been envisaged. Using carbon dioxide gas ($CO_2$) as the activating agent as an alternative to ester has been envisaged.

The carbon dioxide ($CO_2$) can be artificial, being applied directly from cylinders containing the gas, or it can be ambient carbon dioxide ($CO_2$), which is present in the atmosphere in which the briquettes are stored.

According to all this, for the case of an annual recovery of 10,000 MT of rock wool waste by means of manufacturing briquettes, using the sodium silicate binder and the method of the present invention as a replacement for the cement used as a binder in conventional solutions, the reduction in emissions would be the equivalent of 35,300 kg of sulfuric dioxide ($SO_2$) (calculations have been done for briquettes with a percentage by weight of 15% cement in the briquette and 2% $SO_3$ present in the cement used).

This reduction in sulfur emissions is even more significant when a fuel of a residual origin of torrefied biomass is used as raw material as a replacement for the fines from residual materials, specifically as a replacement for coke fines, and in a proportion of 50% by weight with respect to the total weight of the raw material used. In these conditions and according to the previously mentioned production, reductions of 131,550 kg of sulfur dioxide ($SO_2$) and 23,400,000 kg of carbon dioxide ($CO_2$) from fossil fuels are obtained.

The briquettes produced according to the present invention meet needs with respect to:
  Mechanical strength sufficient for industrial handling.
  High productivity which allows assuring the current and future demand.
  Replacement of the cement currently used as a binder with sodium silicate, which favors eliminating sulfur that is supplied by its use.
  Utilization of coke fines in an initial step in the case of such fines being used as raw material, optimizing efficiency of the energy resources available.
  Replacement of coke with torrefied biomass, which favors eliminating sulfur that is supplied by its use and reducing emissions of $CO_2$ from fossil fuels.

A briquette to be used in the mineral fiber manufacturing industry, and more specifically in the rock wool manufacturing industry, which provides significant improvements on an environmental level and better utilization of energy resources is thereby produced.

DETAILED DESCRIPTION OF THE INVENTION

Figure 1:
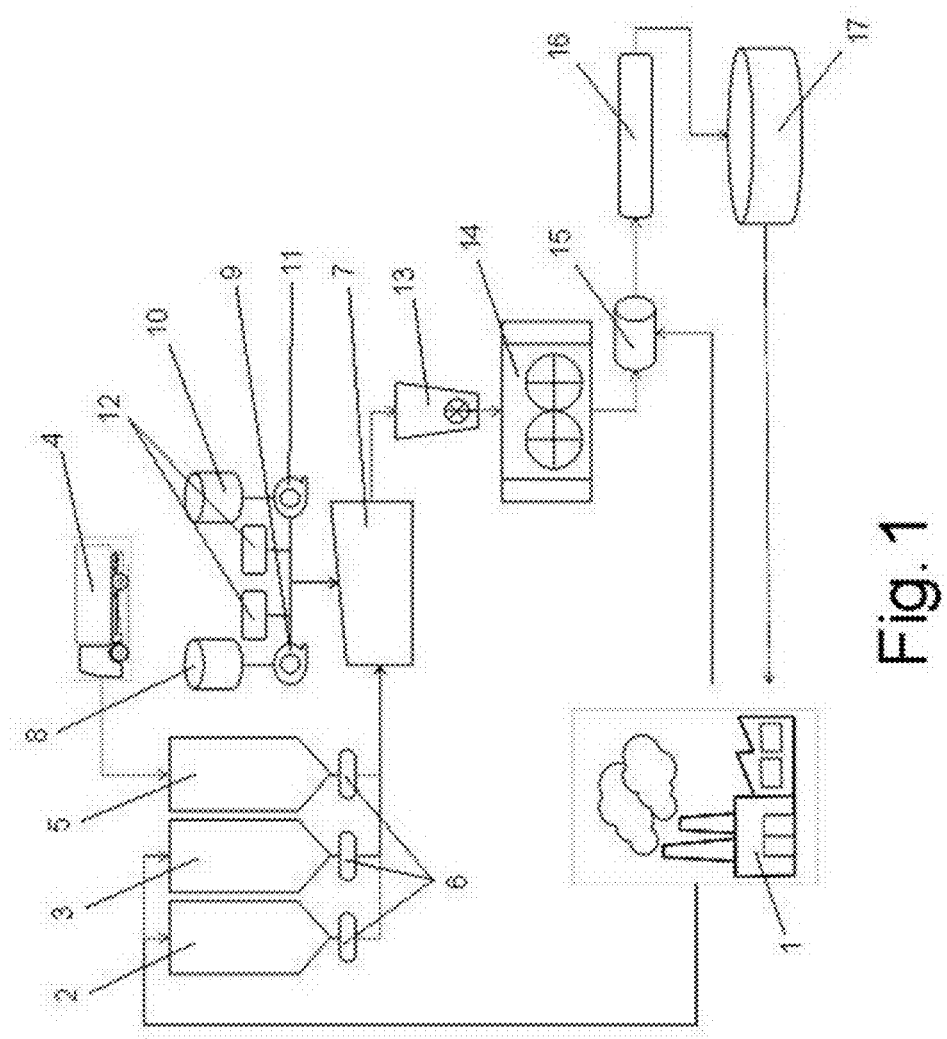
FIG. 1 shows a schematic diagram of manufacturing a briquette according to an embodiment of the invention.

FIG. 1 shows a non-limiting embodiment of a process for the generation of briquettes according to the present invention. In an installation (1) for the generation of rock wool, rock wool waste, coke fines and other raw materials which are reused for manufacturing new rock wool are generated. The rock wool waste and coke fines are stored, respectively, in a rock wool silo (2) and a coke fines silo (3).

Torrefied biomass or another fuel of a residual origin which is stored in a torrefied biomass silo (5) is transported by means of external logistics (4). Each of the silos (2, 3, 5) in which the raw materials for the generation of briquettes are stored, are associated with respective weighing cells (6) which determine the suitable proportions of raw material that are introduced in a mixer (7).

The raw material used for formation of the briquette can comprise rock wool or it can comprise rock wool with coke fines and/or torrefied biomass. More specifically, the rock wool used is in fiber form, the fibers having a diameter between 1 μm and 30 μm with a fiber length to fiber diameter ratio of at least 3:1. The density of the fibers used as raw material is comprised between 0.18 and 0.99 g/cm$^3$.

Therefore, the proportions by weight of raw material used at all times can range from 50% to 100% rock wool waste, from 0% to 10% coke fines, and from 0% to 50% torrefied biomass. The percentage by weight is represented with respect to the total weight of raw materials at the inlet of the mixer (7).

A non-fibrous inorganic binder, specifically sodium silicate, which is used to bind the raw materials in solution, is stored in a binder tank (8). Sodium silicate is injected into the mixer (7) through a binder injection pump (9). Ester, which is introduced into the mixer (7) by means of an ester injection pump (11) in the case of using ester as the activating agent of the mixture located in the mixer (7), is stored in another tank (10).

The amounts to be injected into the mixer (7) by the binder injection pump (9) and ester injection pump (11) are controlled by means of respective flow meters (12). Therefore, the proportion by weight of sodium silicate binder is from 3% to 20% in relation to the total weight of raw materials at the inlet of the mixer (7). Sodium silicate used as a binder allows producing briquettes which, once cured, have a glassy structure with a good degree of mechanical strength.

The proportion by weight of the sodium silicate binder is preferably from 6% to 16% in relation to the total weight of the raw material used.

When the activating agent to accelerate curing of the mixture is an ester, the percentage of ester in relation to the total weight of raw materials at the inlet of the mixer (7) is between 0% and 4%.

Once the time necessary to homogenize the mixture has lapsed, a worm screw hopper (13) pours the mixture from the mixer (7) into a briquetting machine (14) shaping the briquettes.

When an ester is not used as the activating agent, the possibility of a chamber (15) being arranged at the outlet of the briquetting machine (14) for exposing the briquettes to $CO_2$ gas and a heater (16), which allow accelerating the kinetics for the briquette curing reaction, has been envisaged for the purpose of assuring the mechanical strength necessary for subsequent industrial handling. Finally, the briquettes are transported to a storage area (17) in which they are stored until being used in the installation (1) for the generation of new rock wool.

The $CO_2$ gas used to activate briquette curing can be artificial or it can be ambient $CO_2$ gas present in the storage area (17) of the briquettes.

Figure 2:
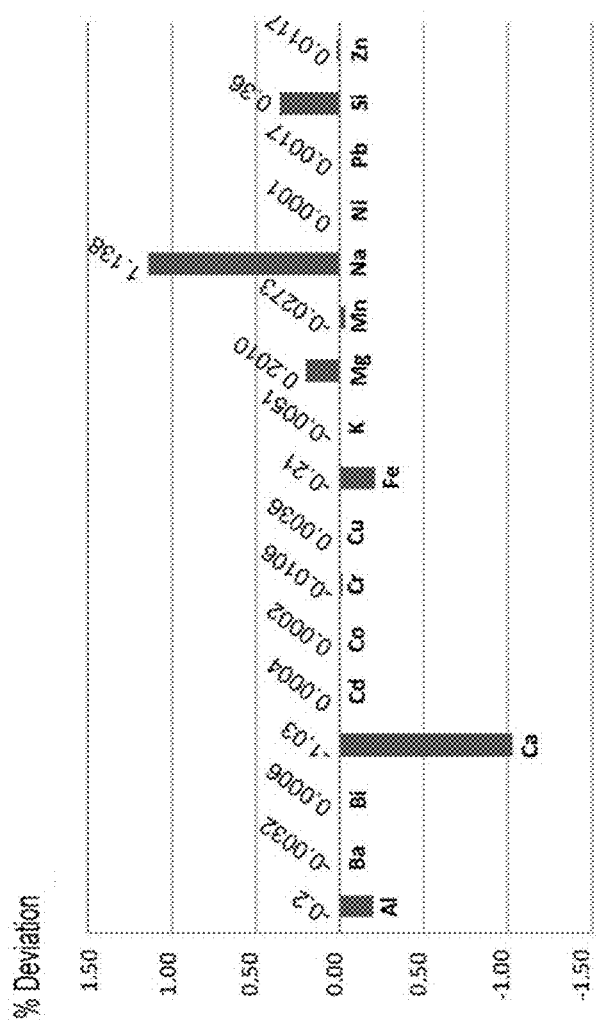
FIG. 2 shows a graph comparing an elemental composition of the rock wool waste and a briquette that has been briquetted with sodium silicate binder according to the present invention.

FIG. 2 shows a graph comparing an elemental composition of rock wool waste and a briquette using rock wool waste compacted with sodium silicate binder as a raw material. The elements making up the rock wool waste, aluminum (Al), barium (Ba), bismuth (Bi), calcium (Ca), cadmium (Cd), cobalt (Co), chromium (Cr), copper (Cu), iron (Fe), potassium (K), magnesium (Mg), manganese (Mn), sodium (Na), nickel (Ni), lead (Pb), silicon (Si), zinc (Zn), are shown on X-axis. The deviation of each of the elements caused by the addition of the sodium silicate ($Na_2SiO_3$) binder is shown on the Y-axis. As can be seen, the chemical alteration of the composition due to the addition of the binder is virtually negligible.

The invention claimed is:

1. A briquette used for the production of rock wool, consisting of a raw material, a binder of the raw material and an activating agent accelerating the curing process of the briquetted raw material, wherein the raw material comprises rock wool waste having a fiber morphology, and the binder is a non-fibrous inorganic binder, such as sodium silicate.

2. The briquette used for the production of rock wool according to claim 1, wherein the rock wool waste in the fiber form has a density comprised between 0.18 and 0.99 g/cm$^3$.

3. The briquette used for the production of rock wool according to claim 1, wherein the fibers of the rock wool waste have a diameter between 1 μm and 30 μm with a fiber length to fiber diameter ratio of at least 3:1.

4. The briquette used for the production of rock wool according to claim 1, wherein the raw material additionally comprises fines from residual materials and/or fuels of a residual origin.

5. The briquette used for the production of rock wool according to claim 4, wherein the raw material used has a percentage by weight of between 50% and 100% rock wool waste, between 0% and 50% of fines from residual materials, and between 0% and 50% of fuels of a residual origin.

6. The briquette used for the production of rock wool according to claim 1, wherein the proportion by weight of the sodium silicate binder is from 3% to 20% in relation to the total weight of the raw material.

7. The briquette used for the production of rock wool according to claim 1, wherein the proportion by weight of the sodium silicate binder is from 6% to 16% in relation to the total weight of the raw material.

8. The briquette used for the production of rock wool according to claim 1, wherein an ester is used as the activating agent in a percentage of 0% to 4% by weight in relation to the total weight of the raw material.

9. The briquette used for the production of rock wool according to claim 1, wherein carbon dioxide gas is used as the activating agent.

10. The briquette used for the production of rock wool according to claim 9, wherein the carbon dioxide gas used is an ambient gas present in the briquette storage area.

11. The briquette used for the production of rock wool according to claim 9, wherein the carbon dioxide gas used is an artificial gas supplied on the briquettes.

* * * * *